(12) United States Patent
Shibuya et al.

(10) Patent No.: US 8,048,955 B2
(45) Date of Patent: Nov. 1, 2011

(54) AROMATIC POLYCARBONATE MOLDED ARTICLE AND RESIN COMPOSITION

(75) Inventors: Kazuhiro Shibuya, Kanagawa (JP); Akira Miyamoto, Kanagawa (JP); Kazuharu Yasuda, Kanagawa (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 838 days.

(21) Appl. No.: 11/587,817

(22) PCT Filed: Apr. 25, 2005

(86) PCT No.: PCT/JP2005/007797
§ 371 (c)(1), (2), (4) Date: Oct. 27, 2006

(87) PCT Pub. No.: WO2005/103155
PCT Pub. Date: Nov. 3, 2005

(65) Prior Publication Data
US 2008/0063861 A1    Mar. 13, 2008

(30) Foreign Application Priority Data

Apr. 27, 2004 (JP) ............... P.2004-130819
Jun. 15, 2004 (JP) ............... P.2004-177241
Oct. 29, 2004 (JP) ............... P.2004-315059

(51) Int. Cl.
C08G 64/00 (2006.01)
C08G 64/04 (2006.01)
C08K 3/16 (2006.01)
C08K 5/42 (2006.01)
C08K 5/521 (2006.01)
C08K 5/02 (2006.01)

(52) U.S. Cl. .......... 524/611; 264/176.1; 264/210.1; 264/211.21; 428/212; 428/215; 524/136; 524/145; 524/157; 524/158; 524/284; 524/394; 524/404; 524/437; 524/462; 524/612; 528/196

(58) Field of Classification Search .......... 264/176.1, 264/210.1, 211.21; 428/212, 215; 524/136, 524/145, 157, 158, 284, 394, 404, 437, 462, 524/611, 612; 528/196
See application file for complete search history.

(56) References Cited

U.S. PATENT DOCUMENTS

| 6,150,443 | A | 11/2000 | Nodera et al. |
| 7,160,937 | B2 * | 1/2007 | Shibuya et al. ............ 524/161 |
| 7,572,847 | B2 * | 8/2009 | Shibuya et al. ............ 524/156 |
| 2005/0154103 | A1 | 7/2005 | Shibuya et al. |

FOREIGN PATENT DOCUMENTS

| JP | 2002-60612 | | 2/2002 |
| JP | 2002-80709 | | 3/2002 |
| JP | 2002080709 | A * | 3/2002 |
| JP | 2002-294063 | | 10/2002 |
| WO | 2004/058894 | | 7/2004 |

OTHER PUBLICATIONS

International Search Report (dated May 31, 2005) of the International Application PCT/JP2005/007797, (3pp).
Supplementary European Search Report issued in corresponding European Patent Application No. 05734313.9 on Jun. 9, 2008.

* cited by examiner

Primary Examiner — Vasu Jagannathan
Assistant Examiner — Richard A Huhn
(74) Attorney, Agent, or Firm — Staas & Halsey LLP

(57) ABSTRACT

A polycarbonate thin molded article containing a resin composition, the resin composition containing: 100 parts by weight of a resin (A), the resin (A) being an aromatic polycarbonate or a resin mainly containing an aromatic polycarbonate;
0.1 to 200 parts by weight of an inorganic compound (B); 0.001 to 10 parts by weight of at least one compound (C) selected from an organic acidic compound and an organic acidic compound derivative; and 0.001 to 1 part by weight of at least one metal salt (D) selected from an organic acid alkali metal salt and an organic acid alkaline earth metal salt, a part corresponding to at least 50% of the surface area of the polycarbonate thin molded article having a thickness of less than 0.7 mm, and a shrinkage ratio S1(%) in a molding flow direction of the polycarbonate thin molded article upon its being left under an atmosphere of 170° C. for 30 minutes satisfying the following formula (1):

$$-60 < S1 < -1 \qquad \text{formula (1).}$$

10 Claims, 2 Drawing Sheets

AROMATIC POLYCARBONATE MOLDED ARTICLE AND RESIN COMPOSITION

This application claims the benefit of PCT International Application No. PCT/JP2005/007797 filed Apr. 25, 2005 and Japanese Application Nos. 2004-130819, 2004-177241 and 2004-315059, filed Apr. 27, 2004, Jun. 15, 2004, and Oct. 29, 2004, respectively, in Japan, the contents of which are incorporated herein by reference.

FIELD OF THE INVENTION

The present invention relates to an aromatic polycarbonate resin molded article excellent in mechanical properties, melt stability, and flame retardancy and to a composition therefor. More specifically, it relates to an aromatic polycarbonate resin molded article excellent in these properties even in the form of a thin molded article and to a composition therefor.

BACKGROUND ART

Since an aromatic polycarbonate is a resin material which not only is excellent in mechanical properties such as impact resistance but also is excellent in heat resistance, it has been widely used as materials for housings or parts of various computers such as desktop computers and notebook computers, printers, word processors, copying machines, and the like.

In recent years, with respect to a molded article formed of an aromatic polycarbonate, particularly in the case where it is intended to use the article as a housing, it has been strongly desired to reduce the thickness of the molded article for the purpose of reducing the weight thereof. Furthermore, since distortion by external stress or under the load of the parts inside the housing tends to occur when a thin housing is used, there has been a demand for aromatic polycarbonates having high stiffness and high dimensional precision.

In order to improve the stiffness and dimensional precision of an aromatic polycarbonate, a method has been attempted in which an inorganic compound, such as a glass fiber, a carbon fiber, talc, mica or wollastonite, is blended with an aromatic polycarbonate as a reinforcing agent and/or a filler.

However, an aromatic polycarbonate resin composition containing such an inorganic compound possesses a problem that, during the molding, the inorganic compound promotes the decomposition and degradation of the aromatic polycarbonate. Particularly, in the case that a basic inorganic compound, such as talc or mica, is used, there arises a problem that the melt stability of the aromatic polycarbonate is remarkably lowered, so that the physical properties of the material are markedly impaired.

Against the problems, methods for suppressing the lowering of the molecular weight of an aromatic polycarbonate have been proposed, for example, by using a phosphorus compound in combination in JP-A-2-283760 of Patent Document 1, by using an organic acid in combination in JP-A-3-21664 of Patent Document 2, and by using a sulfonic acid phosphonium salt in combination in JP-A-10-60248 of Patent Document 3. However, by these methods, the melt stability, particularly at high temperatures, was still unsatisfactory, so that there is a problem that a range of the molding temperature is limited.

On the other hand, with respect to aromatic polycarbonate resin compositions to be used for office automation machines, and electric and electronic devices, it has been desired to achieve high flame retardancy as well as high stiffness and dimensional precision. In recent years, from the environmental viewpoint, it has been desired to develop a molded article formed of a flame retardant aromatic polycarbonate resin composition which contains neither a bromine compound nor a phosphorus compound as a flame retardant.

JP-A-2002-80709 of Patent Document 4 describes an aromatic polycarbonate resin composition which is obtained by blending an aromatic polycarbonate with an inorganic filler, an organophosphorus compound flame retardant and an organic acid alkali metal salt, which achieves V-0 as measured in accordance with UL94 standard with respect to a test specimen having a thickness of 0.8 mm. However, the resin composition is disadvantageous in that a phosphorus flame retardant is used and the physical properties of a molded article using the resin composition are markedly lowered under high humidity and high temperature.

JP-A-2003-82218 of Patent Document 5 and JP-A-2003-268226 of Patent Document 6 each discloses a resin compositions which is obtained by blending an aromatic polycarbonate with an organic acid metal salt, an alkoxysilane compound, a fluorine-containing polymer, an inorganic filler, and optionally an organosiloxane compound. When the organosiloxane compound is blended, the flame retardancy of the resulting resin composition achieves V-0 as measured in accordance with UL94 standard with respect to a test specimen having a thickness of 0.8 mm. However, since an organosiloxane compound has an insufficient thermal stability, there arise disadvantages that the resin composition is likely to suffer discoloration at a high resin-melting temperature and the amount of volatile components generated increases.

JP-A-2003-82218 of Patent Document 5 and JP-A-2003-268226 of Patent Document 6 each discloses a resin composition which is obtained by blending an aromatic polycarbonate with a fluorine-containing resin and a silicate compound. However, the flame retardancy and melt stability of the resin composition is unsatisfactory.

As above, in the conventional art, there has not been obtained a thin molded article formed of an aromatic polycarbonate resin composition containing an inorganic compound, which not only exhibits a high flame retardancy in the form of a thin molded article without using a bromine compound or a phosphorus compound as a flame retardant (for example, V-0 as measured in accordance with UL94 standard with respect to a product having a thickness of less than 0.7 mm, or VTM-0 with respect to a product having a thickness of 0.1 mm or less), but also is excellent in melt stability and mechanical strength as a molding material. Therefore, it has been desired to develop such a molded article.

Furthermore, there is an increasing demand for thin sheets and films having flame retardancy and insulating property as inner members for electronic and electric parts.

Patent Document 1: JP-A-2-283760
Patent Document 2: JP-A-3-21664
Patent Document 3: JP-A-10-60248
Patent Document 4: JP-A-2002-80709
Patent Document 5: JP-A-2003-82248
Patent Document 6: JP-A-2003-268226

DISCLOSURE OF THE INVENTION

Problems to be Resolved by the Invention

An object of the present invention is to provide an aromatic polycarbonate resin molded article excellent in mechanical properties, melt stability, and flame retardancy, and more specifically, a flame retardant aromatic polycarbonate resin molded article excellent in these properties even in a thin molded article as well as a composition.

Means of Solving the Problems

The present inventors have made extensive studies in order to achieve the above object. As a result, it has surprisingly been found that, even without using a bromine compound or a phosphorus compound as a flame retardant, a molded article formed of an aromatic polycarbonate resin composition containing a resin (A) mainly containing an aromatic polycarbonate, an inorganic compound (B), at least one compound (C) selected from organic acidic compounds and organic acidic compound derivatives, and at least one metal salt (D) selected from organic acid alkali metal salts and organic acid alkaline earth metal salts, particularly a thin molded article thereof which is molded so as to be oriented in at least one direction at the time when the thin molded article is formed, not only achieve a very high flame retardancy (for example, V-0 or VTM-0 as measured in accordance with UL94 standard with respect to a product having a thickness of less than 0.7 mm or 0.5 mm or less) as compared to the conventional art, but also has a greatly improved melt stability and is excellent in resistance to moist heat, stiffness, and impact resistance.

Furthermore, the composition and molded article of the invention are effective in the form of a thin molded article. In general, in order to achieve V-0 and VTM-0 as measured in accordance with UL94 standard, an anti-dripping agent is added in many cases so that dripping does not occur at the time when the molded article catches fire. However, in the case of a thin molded article in the V test, burning with flames reaching a clamp is observed when a degree of shrinkage of the test specimen is large during the burning test, so that the case is sometimes judged NC(NC means non-classification). As a result of considering these phenomena, it has been found in the invention that a desired flame retardancy is obtained by controlling the amount of the anti-dripping agent and orientation of the molded article. Moreover, with regard to V-2 or VTM-2 which is obtained when a caught fire goes out within a predetermined period of time even when dripping occurs, it has been found that the composition of the invention preferably does not contain any anti-dripping agent so that dripping rather occurs unlike the cases of V-0 and VTM-0.

Based on these novel findings, the present invention has been completed. Accordingly, it is an object of the invention to provide an aromatic polycarbonate resin composition which has high flame retardancy without using a bromine compound or a phosphorus compound. It is another object of the invention to provide an aromatic polycarbonate molded article formed of the aromatic polycarbonate resin composition of the invention, which not only has extremely high flame retardancy as compared with that of a thin molded article produced from a conventional aromatic polycarbonate resin composition, but also has excellent melt stability, resistance to moist heat, stiffness, and impact resistance.

The foregoing and other objects, features and advantages of the present invention will be apparent from the following detailed description and claims.

According to the fundamental aspect of the invention, there can be provided a polycarbonate thin molded article comprising a resin composition, the resin composition comprising: 100 parts by weight of a resin (A) mainly containing: an aromatic polycarbonate; or an aromatic polycarbonate; 0.1 to 200 parts by weight of an inorganic compound (B); 0.001 to 10 parts by weight of at least one compound (C) selected from an organic acidic compound and an organic acidic compound derivative; and 0.001 to 1 part by weight of at least one metal salt (D) selected from an organic acid alkali metal salt and an organic acid alkaline earth metal salts, a part corresponding to at least 50% of the surface area of the polycarbonate thin molded article having a thickness of less than 0.7 mm, and a shrinkage ratio $S1(\%)$ in a molding flow direction of the polycarbonate thin molded article upon its being left under an atmosphere of 170° C. for 30 minutes satisfying the following formula (1):

$$-60 < S1 < -1 \qquad \text{formula (1).}$$

Next, for facilitating understanding of the invention, basic feature and preferred various aspects of the invention are first enumerated.

Namely, the invention includes the following inventions of 1 to 16.

1. A polycarbonate thin molded article comprising a resin composition, the resin composition comprising: 100 parts by weight of a resin (A), the resin (A) being an aromatic polycarbonate or a resin mainly containing an aromatic polycarbonate; 0.1 to 200 parts by weight of an inorganic compound (B); 0.001 to 10 parts by weight of at least one compound (C) selected from an organic acidic compound and an organic acidic compound derivative; and 0.001 to 1 part by weight of at least one metal salt (D) selected from an organic acid alkali metal salt and an organic acid alkaline earth metal salt, a part corresponding to at least 50% of the surface area of the polycarbonate thin molded article having a thickness of less than 0.7 mm, and a shrinkage ratio $S1(\%)$ in a molding flow direction of the polycarbonate thin molded article upon its being left under an atmosphere of 170° C. for 30 minutes satisfying the following formula (1):

$$-60 < S1 < -1 \qquad \text{formula (1).}$$

2. The polycarbonate thin molded article according to item 1, wherein the birefringent index of the polycarbonate thin molded article is from 0.00001 to 0.002.

3. The polycarbonate thin molded article according to item 1, wherein the resin composition further comprising 1 part by weight or less of a fluoropolymer (E).

4. The polycarbonate thin molded article according to item 1, wherein the compound (C) is contained in such an amount that a mixture of the inorganic compound (B) and the compound (C) has a pH value of from 4 to 8.

5. The polycarbonate thin molded article according to item 3, wherein X and Y satisfy the formula (2) and the formula (3):

$$0.15 \leq X \leq 0.5 \qquad \text{formula (2)}$$

$$0.05 \leq Y \leq 0.4 \qquad \text{formula (3)}$$

wherein the ratio of the metal salt (D) in the resin composition is X % by weight and the ratio of the fluorine compound component of the fluoropolymer (E) in the resin composition is Y % by weight.

6. The polycarbonate thin molded article according to item 5, wherein X and Y satisfy the formula (4), the formula (5) and the formula (6):

$$0.15 \leq X \qquad \text{formula (4)}$$

$$0.05 \leq Y \qquad \text{formula (5)}$$

$$X + Y \leq 0.5 \qquad \text{formula (6).}$$

7. The polycarbonate thin molded article according to item 1, wherein the polycarbonate thin molded article is flame retardant, and a shrinkage ratio $S1(\%)$ in a molding flow direction of the polycarbonate thin molded article upon it is left under an atmosphere of 170° C. for 30 minutes satisfies the following formula (7):

$$-30<S1<-1 \quad \text{formula (7)}.$$

8. The polycarbonate thin molded article according to item 1, wherein a shrinkage ratio S1(%) in a molding flow direction of the polycarbonate thin molded article upon it is left under an atmosphere of 170° C. for 30 minutes satisfies the following formula (8), and a shrinkage ratio S2(%) in a molding vertical direction of the polycarbonate thin molded article satisfies the following formula (9):

$$-60<S1<-1 \quad \text{formula (8)}$$

$$-60<S2<-1 \quad \text{formula (9)}.$$

9. The polycarbonate thin molded article according to item 1, wherein a part corresponding to at least 50% of the surface area of the polycarbonate thin molded article has a thickness of 0.5 mm or less.

10. The polycarbonate thin molded article according to item 1, wherein the polycarbonate thin molded article has flame retardancy represented by V-0 or VTM-0 in the test method in accordance with UL94 standard.

11. The polycarbonate thin molded article according to item 1, wherein the polycarbonate thin molded article has a sheet or film shape.

12. The polycarbonate thin molded article according to item 1, wherein the polycarbonate thin molded article is an insulating sheet or insulating film.

13. The polycarbonate thin molded article according to item 1, wherein the polycarbonate thin molded article is a molded article for electronic or electric devices.

14. An aromatic polycarbonate resin composition comprising: 100 parts by weight of a resin (A) mainly containing an aromatic polycarbonate; 0.1 to 200 parts by weight of an inorganic compound (B); 0.001 to 10 parts by weight of at least one compound (C) selected from an organic acidic compound and an organic acidic compound derivative; and 0.001 to 1 part by weight of at least one organic acid metal salt (D) selected from an organic acid alkali metal salt and an organic acid alkaline earth metal salt.

15. The polycarbonate thin molded article according to item 14, wherein the organic acidic compound is an organic acid.

16. The polycarbonate thin molded article according to item 14, wherein the organic acidic compound derivative is at least one compound selected from the group consisting of an organic acid ester, an organic acid anhydride, an organic acid phosphonium salt, and an organic acid ammonium salt.

Effect of the Invention

The thin molded article of the invention is an aromatic polycarbonate resin molded article excellent in mechanical properties, melt stability, and flame retardancy, and more specifically, a flame retardant aromatic polycarbonate resin molded article excellent in these properties even in the form of a thin molded article as well as a composition therefor.

BEST MODE FOR CARRYING OUT THE INVENTION

The following will explain the present invention in detail.

In the invention, the component (A) is an aromatic polycarbonate or a resin mainly comprising an aromatic polycarbonate.

In the present invention, the "resin mainly comprising an aromatic polycarbonate" means a resin containing an aromatic polycarbonate in an amount of more than 50 parts by weight when total amount of the resin is regarded as 100 parts by weight. The component (A) may contain only an aromatic polycarbonate, or may further contain a thermoplastic resin other than an aromatic polycarbonate.

The aromatic polycarbonate to be preferably used as the component (A) is an aromatic polycarbonate which is derived from an aromatic dihydroxy compound. Examples of the aromatic dihydroxy compounds include bis(hydroxyaryl)alkanes, such as 1,1-bis(4-hydroxy-t-butylphenyl)propane and 2,2-bis(4-hydroxyphenyl)propane; bis(hydroxyaryl)cycloalkanes, such as 1,1-bis(4-hydroxyphenyl)cyclopentane and 1,1-bis(4-hydroxyphenyl)cyclohexane; dihydroxyaryl ethers, such as 4,4'-dihydroxy-3,3'-dimethylphenyl ether; dihydroxyaryl sulfides, such as 4,4'-dihydroxydiphenyl sulfide and 4,4'-dihydroxy-3,3'-dimethylphenyl sulfide; dihydroxyaryl sulfoxides, such as 4,4'-dihydroxydiphenyl sulfoxide and 4,4'-dihydroxy-3,3'-dimethylphenyl sulfoxide; and dihydroxyaryl sulfones, such as 4,4'-dihydroxydiphenyl sulfone and 4,4'-dihydroxy-3,3'-dimethylphenyl sulfone.

Among them, 2,2-bis(4-hydroxyphenyl)propane (so-called "bisphenol A") is particularly preferred. These aromatic dihydroxy compounds can be used individually or in combination of two or more thereof. In the present invention, aromatic polycarbonates which are preferably used as the component (A) can be produced by any known methods. Specifically, there may be used those produced by known methods in which an aromatic dihydroxy compound and a carbonate precursor are reacted with each other, for example, an interfacial polymerization process (e.g., phosgene process) in which an aromatic dihydroxy compound and a carbonate precursor (e.g., phosgene) are reacted with each other in the presence of an aqueous sodium hydroxide solution and methylene chloride solvent; a transesterification process (melt process) in which an aromatic dihydroxy compound and a carbonic diester (e.g., a diphenyl carbonate) are reacted with each other; a solid-phase polymerization process in which a crystallized carbonate prepolymer obtained by the phosgene process or by the melt process is subjected to a solid-phase polymerization (JP-A-1-158033, JP-A-1-271426, and JP-A-3-68627).

As an aromatic polycarbonate resin used as the component (A) of the invention, particularly preferred is an aromatic polycarbonate which is produced from a dihydric phenol (an aromatic dihydroxy compound) and a carbonic diester by a transesterification process and which contains substantially no chlorine atoms.

The weight average molecular weight (Mw) of the above aromatic polycarbonate is generally from 5,000 to 500,000, preferably from 10,000 to 100,000, more preferably from 13,000 to 50,000, still more preferably from 15,000 to 30,000, particularly preferably from 17,000 to 26,000, most preferably 17,000 to 23,000.

In the invention, the weight average molecular weight (Mw) of the aromatic polycarbonate can be measured by gel permeation chromatography (GPC) and determined using a calibration curve for molecular weight conversion, which is derived from the following formula based on a constitutional curve obtained with respect to standard monodisperse polystyrene samples using polystyrene gels and tetrahydrofuran as a solvent.

$$M_{PC} = 0.3591 M_{PS}^{1.0388}$$

($M_{PC}$ means molecular weight of aromatic polycarbonate and $M_{PS}$ means molecular weight of polystyrene)

Moreover, as the component (A) of the invention, two or more types of polycarbonates having different molecular weights can be used in combination. For example, an aromatic polycarbonate usable as a raw material for an optical disk, which in general has Mw of from 14,000 to 16,000, can be used in combination with an aromatic polycarbonate usable as a raw material for injection molding or extrusion molding, which in general has a weight average molecular weight (Mw) of from 20,000 to 50,000.

Examples of thermoplastic resins other than an aromatic polycarbonate, which can be preferably used in the resin (A) mainly containing any of the above aromatic polycarbonates, include a polystyrene resin; a high impact polystyrene (HIPS) resin; an acrylonitrile/styrene resin (AS resin); a butyl acrylate/acrylonitrile/styrene resin (BAAS resin); an acrylonitrile/butadiene/styrene resin (ABS resin); a methyl methacrylate/butadiene/styrene resin (MBS resin); a butyl acrylate (rubber)/acrylonitrile/styrene resin (AAS resin); polyester resins, such as polyethylene terephthalate and polybutylene terephthalate; polyamide resins; polymethyl methacrylate; polyarylates; core-shell-type impact resistance-modifying elastomers; silicone elastomers, and the like thermoplastic resins. An AS resin or a BAAS resin is preferred for improving the fluidity, an ABS resin or an MBS resin is preferred for improving the impact resistance, and a polyester resin is preferred for improving the chemical resistance.

With respect to the above-mentioned resin (A) mainly containing an aromatic polycarbonate, the amount of the thermoplastic resin to be used other than an aromatic polycarbonate is preferably from 0.1 to 30 parts by weight, more preferably from 0.5 to 20 parts by weight, still more preferably from 1 to 15 parts by weight, relative to 100 parts by weight (total amount) of the component (A).

In the invention, the component (B) is an inorganic compound. In this connection, the component (B) is preferably a solid inorganic compound.

In the invention, by virtue of the use of the component (B), the aromatic polycarbonate resin composition not only can acquire high flame retardancy, but also can be improved with respect to stiffness and strength (due to the function as a reinforcing agent) and improved with respect to dimensional precision (due to the function as a filler).

Examples of the component (B) in the invention include a glass fiber, a carbon fiber, an aluminum borate whisker, a calcium titanate whisker, a rock wool, a silicon nitride whisker, a boron fiber, a tetrapod-shaped zinc oxide whisker, and wollastonite.

Examples of the component (B) in the form of a plate include talc, mica, pearl mica, glass flake, and kaolin.

Examples of the component (B) which is spherical (or substantially spherical) include glass beads, a glass balloon, carbon black, a glass powder, and silica (a natural silica and a synthesized silica).

As the component (B) to be used in the invention, there can be also used a compound which has been surface-modified for improving the interfacial affinity thereof with the aromatic carbonate in the resin composition of the invention. The surface modification herein can be performed by a method of adsorbing a lipophilic organic compound beforehand or by a method of treating the component (B) with a silane coupling agent or a titanate coupling agent.

In the invention, as the component (B), it is preferred to use a carbon fiber or a silicate compound, such as talc, mica, pearl mica, wollastonite, kaolin, a glass fiber, or a glass flake.

Among the above-mentioned silicate compounds which can be preferably used as the component (B), particularly preferred silicate compound is a silicate compound containing a metal oxide component and $SiO_2$ component. The silicate ion present in the silicate compound usable as the component (B) may be in any form, such as an orthosilicate, a disilicate, a cyclic silicate, a linear silicate, or a layered silicate.

The above-mentioned silicate compound may be in the form of a composite oxide, an oxyacid salt or a solid solution. The above-mentioned composite oxide may either be a combination of two or more different simple oxides, or a combination of a simple oxide and an oxyacid salt. The above-mentioned solid solution may either be a solid solution of two or more different metal oxides, or a solid solution of two or more different oxyacid salts.

The above-mentioned silicate compound may be a hydrate. The water of crystallization in a hydrate may be in any form, for example, one contained as a hydrogen silicate ion in the form of an Si—OH, one contained as a hydroxide ion (OH$^-$) toward a metal cation, and one contained as a water molecule which is present in the voids of the structure.

As the above-mentioned silicate compound, either a natural compound or a synthesized compound may be used. As a synthesized compound, there can be utilized a silicate compound obtained by hitherto known various synthetic methods using, for example, a solid reaction, a hydrothermal reaction, or an ultrahigh-pressure reaction.

The silicate compound particularly preferably used as the component (B) of the invention is preferably one having a composition substantially represented by the following formula (10).

$$xMO \cdot ySiO_2 \cdot zH_2O \qquad (10)$$

wherein each of x and y represents a natural number, z represents an integer of 0 or more, and MO represents a metal oxide component and may be a plurality of different metal oxide components.

Examples of the metal M in the above-mentioned metal oxide MO include potassium, sodium, lithium, barium, calcium, zinc, manganese, iron, cobalt, magnesium, zirconium, aluminum and titanium.

The silicate compound represented by the above formula (1) preferably contains CaO and/or MgO, more preferably contains substantially only CaO and/or MgO, and most preferably contains substantially only MgO as the metal oxide MO.

Specific examples of silicate compounds which can be preferably used as the component (B) of the invention include talc, mica, wollastonite, xonotlite, kaolin clay, montmorillonite, bentonite, sepiolite, imogolite, sericite, lawsonite and smectite.

As mentioned above, the silicate compound may be used in any form (e.g., a plate, a needle, a sphere, or a fiber). However, the silicate compound is preferably in the form of a plate, a needle, or a fiber. In particular, one in the form of plate-shaped particles can be most preferably used as the component (B) of the invention. Herein, the term "plate-shaped particles" means particles in which the ratio (a)/(c), wherein (a) is the average particle diameter of the particles as measured in terms of a median diameter of the plate-shaped component (B), and (c) is the thickness, is from 5 to 500, preferably from 10 to 300, more preferably from 20 to 200.

In the invention, the above-mentioned average particle diameter (a) of the component (B) is preferably from 0.001 to 500 μm, more preferably from 0.01 to 100 μm, still more preferably from 0.1 to 50 μm, particularly preferably from 1 to 30 μm.

The above-mentioned average particle diameter (a) is measured by either of the below-mentioned two methods, depending on the approximate distribution range of the particle diameters of the component (B).

When the particle diameters of the component (B) are distributed in the range of from 0.001 to 0.1 μm, the average particle diameter (a) can be measured as follows. A photomicrograph is taken using a transmission electron microscope. From the resulting microscopic photomicrograph, the area of each of 100 or more particles in the resin composition on the photomicrograph is measured on each particle. Using S (a value obtained by dividing the measured area on the photograph by the magnification of the microscope), the particle diameter of each particle are calculated by the formula $(4S/\pi)^5$ and the number average particle diameter is defined as the average particle diameter (a).

When the particle diameters of the component (B) are distributed in the range of from 0.1 to 300 μm, particle diameters thereof can be measured by a laser diffraction method (e.g., using a laser diffraction particle size analyzer "SALD-2000" manufactured by Shimadzu Corporation, Japan), and the median diameter is defined as the average diameter.

In the invention, the thickness (c) of the component (B) in the form of plate-shaped particles is preferably from 0.01 to 100 μm, more preferably from 0.03 to 10 μm, still more preferably from 0.05 to 5 μm, particularly preferably from 0.1 to 3 μm.

The thickness of the plate-shaped particles to be used as the component (B) can be measured as follows. A photomicrograph is taken using a transmission electron microscope. From the resulting microscopic photomicrograph, the thickness of each of ten or more individual particles on the photomicrograph is measured. A value obtained by dividing the thickness on the above photograph by the magnification of the microscope is determined as the thickness of each particle and an average value thereof is defined as the thickness (c).

Among the plate-shaped silicate compounds which are usable as the component (B) of the invention, particularly preferred are talc and mica.

A talc which is particularly preferred as the component (B) of the invention is a hydrous magnesium silicate having a layered structure, which is represented by the following chemical formula: $4SiO_2 \cdot 3MgO \cdot H_2O$, Such a hydrous magnesium silicate generally contains about 63% by weight of $SiO_2$, about 32% by weight of MgO, about 5% by weight of $H_2O$, and other metal oxides, such as $Fe_2O_3$, CaO and $Al_2O_3$, and has a specific gravity of about 2.7.

Furthermore, as the component (B) of the invention, there can be preferably used a calcined talc and a talc from which impurities have been removed by washing with an acid, such as hydrochloric acid and sulfuric acid. Moreover, there can be also used a talc having its surface rendered hydrophobic by a surface treatment with a silane coupling agent or a titanate coupling agent.

On the other hand, as a mica which is particularly preferably used as the component (B), there can be mentioned crushed particles of a silicate mineral containing aluminum, potassium, magnesium, sodium, iron and the like. Specific examples of such micas include white mica (muscovite, chemical formula: $K(AlSi_3O_{10})(OH)_2Al_4(OH)_2(AlSi_3O_{10}$ K), bronze mica (phlogopite, chemical formula: $K(AlSi_3O_{10})(OH)_2Mg_6(OH)_2\text{-}(AlSi_3O_{10})K$), black mica (biotite, chemical formula: $K(AlSi_3O_{10})(OH)_2(Mg,Fe)_6(OH)_2(AlSi_3O_{10})$ K) and synthetic mica (fluorine-phlogopite, chemical formula: $K(AlSi_3O_{10})(OH)_2F_2Mg_6F_2(AlSi_3O_{10})K$). In the invention, any of these micas can be used; however, white mica is preferred.

Further, the above mica may have its surface rendered hydrophobic by a surface treatment with a silane coupling agent or a titanate coupling agent.

In the invention, the amount of the component (B) to be used is from 0.1 to 200 parts by weight, preferably from 0.3 to 100 parts by weight, more preferably from 0.5 to 50 parts by weight, still more preferably from 0.8 to 30 parts by weight, particularly preferably from 1 to 20 parts by weight, relative to 100 parts by weight of the component (A). When the amount of the component (B) is more than 200 parts by weight, the melt stability is markedly lowered and the mechanical properties of the resin composition are remarkably lowered. On the other hand, when the amount of the component (B) is less than 0.1 part by weight, the flame retardancy of the resin composition tends to be lowered, thus rendering it impossible to achieve a high level of flame retardancy which is aimed at in the invention.

Furthermore, in the invention, when a plate-shaped compound, such as a talc or mica, is used as the component (B), particularly excellent flame retardancy can be achieved even in the form of a thin molded article, and also the resin composition is improved with respect to impact resistance, dimensional stability, and electrical properties, such as insulating properties and tracking resistance, of the resin composition can be improved. Therefore, the case is most preferred as an embodiment of the present invention.

The component (C) to be used in the invention is at least one compound selected from organic acidic compounds and organic acidic compound derivatives. Moreover, the component (C) is preferably at least one compound selected from the group consisting of organic acid esters, organic acid anhydrides, organic acid phosphonium salts and organic acid ammonium salts.

In the invention, the amount of the component (C) to be used is from 0.001 to 10 parts by weight, preferably from 0.001 to 3 parts by weight, more preferably from 0.005 to 2 parts by weight, still more preferably from 0.01 to 1 part by weight, particularly preferably from 0.05 to 0.8 part by weight, still particularly preferably 0.08 to 0.5 parts by weight relative to 100 parts by weight of the component (A). When the amount of the component (C) is more than 10 parts by weight or less than 0.001 part by weight, the melt stability is markedly lowered and the mechanical properties of the resin composition are remarkably lowered, or the flame retardancy of the resin composition tends to be lowered, thus rendering it impossible to achieve a high level of flame retardancy which is aimed at in the invention.

In the invention, by using the component (C) in combination with the component (B), wherein the amount of the component (C) is adjust so that a mixture of component (B) and component (C) has a pH value of from 4 to 8, it has become possible to improve greatly the flame retardancy and melt stability of the resin composition, so that the case is particularly preferred.

The organic acidic compound to be used as the component (C) of the invention is preferably an organic acid. Moreover, the organic acid is preferably an organic compound having at least one group in the molecular structure selected from the group consisting of an —$SO_3H$ group, a —COOH group, and a —POH group, i.e., an organic sulfonic acid, an organic carboxylic acid, and an organic phosphoric acid. In the invention, among them, an organic sulfonic acid and an organic carboxylic acid are preferred, and an organic sulfonic acid is particularly preferred.

Furthermore, the organic acid compound derivative to be used as the component (C) of the invention is preferably an organic acid ester, an organic acid anhydride, an organic acid phosphonium salt, and an organic acid ammonium salt, which are derivatives of the above-mentioned organic acids. It is presumed that the above-mentioned organic acid derivative is decomposed during the molding of the resin composition and thus functions as an acid. Therefore, for example, when an inorganic compound showing basicity is used as the component (B), the component (C) seems to exhibit a function of neutralizing it. Thus, in the composition of the invention, the component (C) exhibits a function of adjusting pH.

As the above compound (C), not only a low-molecular-weight compound such as a monomer but also an oligomeric or polymeric one may be used.

In the present invention, as the component (C), two or more types of compounds can be used in combination.

As the component (C) of the invention, it is particularly preferred to use an organic sulfonic acid derivative or an organic carboxylic acid selected from organic sulfonic acids and organic sulfonic acid esters, organic sulfonic acid phosphonium salts, and organic sulfonic acid ammonium salts.

In particular, when an organic sulfonic acid and/or an organic sulfonic acid ester are/is used as the component (C), melt stability of the resin composition is particularly excellent and the generation of volatile substances can be suppressed to a low level. Therefore, the molding can be performed within a broad range of temperature and also the molded article has an extremely excellent appearance.

Examples of organic sulfonic acids which can be preferably used as the component (C) of the invention include aromatic sulfonic acids, such as benzenesulfonic acid, p-toluenesulfonic acid, xylenesulfonic acid, naphthalenesulfonic acid, diisopropylnaphthalenesulfonic acid, diisobutylnaphthalenesulfonic acid, and dodecylbenzenesulfonic acid; and polymeric or oligomeric organic sulfonic acids, such as aliphatic sulfonic acids having 8 to 18 carbon atoms, sulfonated polystyrenes, and methyl acrylate/sulfonated styrene copolymers.

Furthermore, the organic sulfonic acid which is preferably used as the component (C) may be an organic sulfonic acid compound having an —OH group, an —NH$_2$ group, a —COOH group, a halogen group, or the like in addition to an —SO$_3$H group in the molecular structure. Examples thereof include naphthol sulfonic acid, sulfamic acid, naphthylamine sulfonic acid, sulfobenzoic acid, perchlorinated or partially chlorinated organic sulfonic acids (chloro group-containing organic sulfonic acids), and perfluorinated or partially fluorinated organic sulfonic acids (fluoro group-containing organic sulfonic acids).

As the component (C) to be used in the invention, aromatic sulfonic acids are particularly preferred and benzenesulfonic acid, p-toluenesulfonic acid, naphthalenesulfonic acid, and the like can be mentioned as most preferred examples.

In the invention, the content of the component (C) is preferably such an amount that a mixture of the component (B) and the component (C) has a pH value of from 4 to 8. The pH value in the invention can be measured in accordance with JIS K5101.

In JIS K5101, two types of pH measurement methods are prescribed, namely, the boiling method and the ordinary temperature method as operating methods. In the invention, the boiling method is used.

Moreover, in the measurement of the pH value of the mixture of the mixture of the component (B) and the component (C), when the component (C) has a poor solubility in water, an alcohol such as ethanol or isopropyl alcohol is used as a dispersing agent for a suspension.

An amount of the component (C) in the invention to be used varies depending on the type, shape and amount of the component (B), and the type of the component (C).

The amount of the component (C) is preferably such an amount that the mixture of the component (B) and the component (C) has a pH value of from 4.2 to 7.8, more preferably from 4.5 to 7.2.

In the invention, the component (D) is at least one organic acid metal salt selected from organic acid alkali metal salts and organic acid alkaline earth metal salts. The component (D) acts on the resin (A) mainly containing the aromatic polycarbonate resin composition to promote the decarboxylation of the aromatic polycarbonate during the combustion.

The organic acid metal salt which is usable as the component (D) is a metal salt of an organic sulfonic acid and/or a metal salt of a sulfuric ester. They can be used individually or as a mixture of two or more thereof.

Examples of the alkali metal contained in the component (D) of the invention include lithium, sodium, potassium, rubidium, and cesium. Examples of the alkaline earth metal include beryllium, magnesium, calcium, strontium, and barium. In the invention, particularly preferred alkali metals are lithium, sodium, and potassium, and most preferred are sodium and potassium.

As the above-mentioned metal salts of organic sulfonic acids which can be preferably used in the invention, there may be mentioned alkali/alkaline earth metal salts of aliphatic sulfonic acids, alkali/alkaline earth metal salts of aromatic sulfonic acids, and the like. In the present specification, the term "alkali/alkaline earth metal salts" is used to indicate both alkali metal salts and alkaline earth metal salts.

As the alkali/alkaline earth metal salts of aliphatic sulfonic acids, there can be preferably used alkali/alkaline earth metal salts of alkanesulfonic acids having 1 to 8 carbon atoms; alkali/alkaline earth metal salts of such alkanesulfonic acids, wherein each alkyl group thereof is partially substituted with fluorine atom(s); and alkali/alkaline earth metal salts of perfluoroalkanesulfonic acids having 1 to 8 carbon atoms. Particularly preferred specific examples thereof include sodium perfluoroethanesulfonate and potassium perfluorobutanesulfonate.

Of the component (D) in the invention, as more preferred alkali/alkaline earth metal salts, alkali/alkaline earth metal salts of aromatic sulfonic acids and alkali/alkaline earth metal salts of perfluoroalkanesulfonic acids can be mentioned.

In the invention, the amount of the component (D) to be used is from 0.001 to 1 part by weight, preferably from 0.01 to 0.9 part by weight, more preferably from 0.1 to 0.8 part by weight, most preferably from 0.4 to 0.7 part by weight, relative to 100 parts by weight of the component (A). When the amount of the component (D) is more than 1 part by weight, the melt stability is markedly lowered and the mechanical properties of the resin composition are lowered to a large extent. Also, when the amount of component (D) is less than 0.001 part by weight, the flame retardancy of the resin composition tends to be lowered, rendering it impossible to achieve a high flame retardancy, which is aimed at in the invention.

The aromatic polycarbonate resin composition of the present invention may contain a fluoropolymer (E), which is used as an anti-dripping agent of flaming substances. A fluoropolymer which can be preferably used in the invention is a fluoropolymer having a fibril-forming ability. Tetrafluoroethylene polymers, such as polytetrafluoroethylene and a tetrafluoroethylene/propylene copolymer can be preferably used. Particularly preferred is a polytetrafluoroethylene.

As the fluoropolymers, there may be used any of various forms of fluoropolymers, such as fine powdery fluoropolymers, aqueous fluoropolymer dispersions, and powder mixtures with second resin(s), such as an acrylonitrile/styrene copolymer (AS) and polymethyl methacrylate (PMMA).

Examples of aqueous fluoropolymer dispersions which can be preferably used in the invention include "Teflon 30J (registered trademark)" manufactured by Mitsui-DuPont Fluorochemicals Company Limited, and "Polyflon D-1 (registered trademark)", "Polyflon D-2 (registered trademark)", "Polyflon D-2C (registered trademark)" and "Polyflon D-2CE (registered trademark)" manufactured by Daikin Industries, Ltd.

In addition, it is possible to use a fluoropolymer in the form of a powder mixture with second resin such as AS or PMMA as the fluoropolymer. Technologies on the fluoropolymers in the form of a powder mixture with the second resin are disclosed in, for example, JP-A-9-95583, JP-A-11-49912, JP-A-2000-143966, and JP-A-2000-297189. Examples of the fluoropolymers in the form of a powder mixture with second resin which can be preferably used in the invention include "Blendex 449 (registered trademark)" manufactured by GE Specialty Chemicals, U.S.A., and "Metablen A-3800 (registered trademark)" manufactured by Mitsubishi Rayon Co., Ltd.

The amount of the fluoropolymer (E) to be blended in the invention is preferably 1 part by weight or less, more preferably 0.5 part by weight or less, particularly preferably 0.2 part by weight or less, relative to 100 parts by weight of the component (A). Moreover, the amount of the fluoropolymer (E) to be blended is preferably from 0.01 to 1 part by weight, more preferably from 0.05 to 0.8 part by weight, particularly preferably from 0.1 to 0.7 part by weight, relative to 100 parts by weight of the component (A). The fluoropolymer is used as an anti-dripping agent and it is not necessary to use it when a thin molded article is oriented and dripping is inhibited during combustion to achieve a desired flame retardancy without using the fluoropolymer. Specifically, in the case that a desired flame retardancy is V-2 or VTM-2 as measured in accordance with UL94 standard, it is not necessary to use the fluoropolymer.

Recently, from environmental viewpoint, there has been desired a material containing a lesser amount of halogen compounds in the resin composition.

However, in order to exhibit a stable and high flame retardancy such as V-0 or VTM-0 in a thin molded article made of a polycarbonate, it has been found that it is effective to incorporate a fluorine compound in a small amount. In the case that the metal salt (D) in the invention is a fluorine compound, sum of the ratio (X % by weight) of the component (D) in the resin composition and the ratio (Y % by weight) of the fluorine compound component of the fluoropolymer (E) in the resin composition is desirably small. Preferably, it is desirable that X is from 0.15% by weight to 0.5% by weight and Y is from 0.05% by weight to 0.4% by weight. More preferred is such an amount that X is 0.15% by weight or more, Y is 0.05% by weight or more, and X+Y is 0.5% by weight or less.

In the aromatic polycarbonate resin composition of the invention, if necessary, additives such as a colorant, a lubricant, a mold release agent, a thermal stabilizer, an antioxidant, a UV absorbent, an antistatic agent, and a conductive material may be further added thereto.

The UV absorbent is not particularly limited as far as it is generally used in polycarbonate resins, and there may be mentioned benzophenone-based UV absorbents, benzotriazole-based UV absorbents, hydroxyphenyltriazine-based compounds, and the like. Moreover, in order to further improve weather resistance, the composition may contain a hindered amine-based light stabilizer and various antioxidants.

The benzophenone-based UV absorbents include 2-hydroxy-4-n-dodecyloxybenzophenone, 2,2'-dihydroxy-4,4'-dimethoxybenzophenone, bis(5-benzoyl-4-hydroxy-2-methoxyphenyl)methane, and the like.

The benzotriazole-based UV absorbents include 2-(2H-benzotriazol-2-yl)-4-(1,1',3,3'-tetramethylbutyl)phenone, 2-(2H-benzotriazol-2-yl)-4,6-bis(1-methyl-1-phenylethyl) phenol 2-(2'-hydroxy-5'-methylphenyl)benzotriazole, 2-(2'-hydroxy-3',5'-diphenyl-tert-amylphenyl)benzotriazole, 2-(2'-hydroxy-3',5'-bis($\alpha,\alpha'$-dimethylbenzyl)phenylbenzotriazole, 2,2'-methylenebis[4-(1,1,3,3-tetramethylbutyl)-6-(2H-benzotriazol-2-yl)phenol, a condensate of methyl-3-[3-tert-butyl-5-(2H-benzotriazol-2-yl)-4-hydroxyphenylpropionate-polyethylene glycol, and the like.

The amount of the above-mentioned additives to be used is generally 15 parts by weight or less, preferably 10 parts by weight or less, more preferably 3 parts by weight or less, most preferably 1 part by weight or less, relative to 100 parts by weight (total amount) of the resin composition.

The following will describe a process for producing the aromatic polycarbonate resin composition of the invention.

The aromatic polycarbonate resin composition of the invention can be produced by blending the above-mentioned components (A) to (D), and optionally (E) and other components, in their respective amounts as mentioned above, followed by melt-kneading by means of an extruder. For the blending of the individual components and melt-kneading, there may be used conventional devices, e.g., a premixer, such as a tumbler and a ribbon blender, a melt-kneader, such as a single-screw extruder, a twin-screw extruder, and a co-kneader. Moreover, in the feeding of raw materials to the melt-kneader, the components may be mixed together beforehand and then they can be fed thereto. It is also possible to feed each of the components individually to the melt-kneader.

In the production of the aromatic polycarbonate resin composition of the invention, there is no particular limitation with respect to the form of the component (A), which may be in the form of, for example, pellets, a powder, or a flake.

In the production of the aromatic polycarbonate resin composition of the invention, it is preferred that, prior to feeding into a melt-kneader, the surface and inside of the component (B) is subjected to a chemical or physical treatment with the component (C) through a covalent bond, an ionic bond, an intermolecular force, or a hydrogen bond.

As a method for the surface treatment of the component (B) with the component (C), for example, the following method may be mentioned. A predetermined amount of the component (C) is blended with the component (B) and, if necessary, the component (C) is brought into contact with the component (B) by a method such as spraying, dropping, wetting, immersion or the like, the component (C) being used in a molten form, liquid form, or gas form. Then, the component (B) and the component (C) are mixed together under stirring by means of a mechanical mixing apparatus (e.g., a Henschel mixer, a Nauter mixer, a V-blender, or a tumbler), followed by removal of excess amounts of components by evaporation and drying treatment. The mixing under stirring may be performed at a temperature not higher than the melting point of the component (C), but it is more effective to elevate the temperature of the mixture to a temperature which is equal to or higher than the melting point of the component (C). The time required for the mixing under stirring varies depending on the type of mixing apparatus used, but is generally from 1 minute to 3 hours, preferably from 2 minutes to 1 hour, more preferably from 3 minutes to 40 minutes, still more preferably from 5 minutes to 30 minutes. With respect to the mixing apparatus, it is particularly preferred to use a Henschel mixer or a Nauter mixer, each of which is equipped with a heater. In addition, it is preferred that, after the mixing under stirring, an excess amount of the component (C) is removed by evaporation under reduced pressure and/or heating and the resultant mixture is thoroughly dried.

As the melt-kneader to be used for producing the resin composition of the invention, generally an extruder, preferably a twin-screw extruder is used. The component (B) may be fed through a side feeder provided around a middle portion of the extruder. The melt-kneading can be generally performed under conditions suitably selected from the ranges where the cylinder temperature is from 200 to 300° C., preferably from 220 to 270° C., and the rotation number of the extruder is from 100 to 700 rpm, preferably from 200 to 500 rpm, but care must be taken to prevent the generation of excess heat during the melt-kneading. Furthermore, it is effective to provide an opening at a downstream portion of the extruder, so as to remove volatile substances therefrom under normal pressure or, if necessary, under reduced pressure. Moreover, in general, the residence time of the starting resin in the extruder is suitably selected from the range of from 10 to 60 seconds.

The molding method for obtaining a molded article formed of the aromatic polycarbonate resin composition of the invention may be a usual molding method. In the case of preparing sheet-shaped thin molded articles, sheet-extrusion molding, inflation molding, and calendar molding are preferably used. Moreover, injection molding, compression molding, injection compression molding, and blow molding may be also used. As particularly preferred method for obtaining thin molded articles, injection molding and sheet-extrusion molding are preferably used. In the case of injection molding, there may be used a method of dissolving nitrogen or carbon dioxide as a plasticizer in a molten resin to enhance fluidity of the molten resin as a special procedure for preparing thin molded articles. A vent part may be suitably provided on the cylinder of an injection molding machine and nitrogen or carbon dioxide may be injected therefrom. Moreover, in order to improve a transferring ability of molded articles and to prevent defective appearance (swirl mark) at the time when a resin obtained by dissolving nitrogen or carbon dioxide in the molten resin as mentioned above is filled into a mold, nitrogen gas or carbon dioxide may be filled into the mold beforehand prior to filling the molten resin into the mold. In this case, carbon dioxide is preferably used for the purpose of improving a transferring ability.

The molded article in the invention may be a molded article having such a high level of flame retardancy that is hitherto difficult to achieve particularly in thin molded articles. Specifically, there may be mentioned a molded article having a flame retardancy of V-0, V-1, or V-2, preferably V-0 in accordance with UL standard even in a molded article wherein a part corresponding to at least 50% of the total surface area of the molded article has a thickness of less than 0.7 mm, furthermore a part corresponding to at least 50% of the total surface area of the molded article has a thickness of 0.5 mm or less. Moreover, in the case of thinner films, there may be mentioned a molded article having a flame retardancy of VTM-0, VTM-1, or VTM-2, preferably VTM-0 in accordance with UL standard, for example, in the case of 0.4 mm or less. A lower limit of the thickness is preferably 0.001 mm and, more preferably 0.03 mm in consideration of the objects of the invention. Total area in a molded article, i.e., molded article area generally shows area of a molded article-forming cavity part of a concave mold which forms outer surface, when a convex mold and a concave mold are used as in the case of injection molding, injection compression molding, or the like. Moreover, when a sheet- or film-shaped molded article is prepared by sheet-extrusion molding or the like, the molded article area shows area of the sheet or film. Furthermore, in the case of a molded article wherein only one surface of the molded article comes into contact with a mold as in the case of blow molding, the molded article area shows area of the outer surface with which the resin comes into contact.

The polycarbonate thin molded article wherein a shrinkage ratio S1(%) in the molding flow direction when it is left under an atmosphere of 170° C. for 30 minutes satisfies the following formula (1) means a molded article having a shrinking ability within a certain range at a high temperature.

$$-60<S1<-1 \quad \text{formula (1)}$$

With regard to the measurement of the shrinkage ratio, a specimen for heat shrinkage test (a length of 120 mm, a width of 120 mm) in accordance with JIS K6873 is cut out of the sheet. A cross mark is put on the specimen for heat shrinkage test cut out. The mark is a cross where the crossing point of a line (length: 100 mm) parallel to the extrusion direction and a line (length: 100 mm) vertical thereto corresponds to the center of the sheet. The sheet is left under an atmosphere of 170° C. for 30 minutes and a shrinkage ratio of the molded article taken out is measured. The heat shrinkage ratio is calculated according to the following formula (11):

$$S=(l_2-l_1)/l_1 \times 100 \quad (11)$$

wherein S means heat shrinkage ratio (%), $l_1$ means distance (mm) between the marks before heating, and $l_2$ means distance (mm) between the marks after heating.

It has been found that the thin molded article having a composition according to the invention possesses a certain shrinkage ratio shown by the above formula (11) and thereby the thin molded article as a product has a short flame-quenching time when exposed to flames. When the shrinkage ratio is −1% or more, dripping may be probably involved at catching fire. To the contrary, when the ratio is −60% or less, the molded article shrinks too much to lose a function of a thin molded article as a product. At the same time, also in a specimen for UL test, when the shrinkage ratio is −1% or more, dripping may be probably involved at catching fire and achievement of V-0, V-1, VTM-0, or VTM-1 becomes difficult. To the contrary, when the ratio is −60% or less, the molded article shrinks too much during the burning test, resulting in impossibility of the V test (NOT-V) and impossibility of VTM test (NOT-VTM).

A preferred range of the shrinkage ratio in the invention is larger than −60% and smaller than −1%, more preferably larger than −30% and smaller than −1% in a molding flow direction.

The other preferred form is a thin molded article which shrinks biaxially. In general, in a sheet or film prepared by extrusion molding, a shrinkage ratio S2 in a direction vertical to the molding direction sometimes exceeds 0% when the sheet or film is exposed to high temperature, for example, an atmosphere of 170° C. in the case of the thin molded article of the invention). Therefore, in the product, when fire comes into contact with the sheet for any reason and it catches fire, it becomes possible to quench flames so as to enwrap the flames by two-directional shrinkage.

A preferred range of the shrinkage ratio of the thin molded article which shrinks biaxially is desirably larger than −60% and smaller than −1% in a molding flow direction and is desirably larger than −60% and smaller than −1% in a molding vertical direction.

As a method for biaxial stretching, a sheet may be stretched biaxially after extrusion or a sheet may be stretched in an extrusion direction at extrusion and, after the extrusion, may be stretched only in a direction vertical to the extrusion.

Another preferred characteristic of the thin molded article of the invention is a molded article having a birefringent index within a predetermined range, wherein the birefringent index is preferably from 0.00001 to 0.002, more preferably from 0.0001 to 0.001.

The birefringent index herein is a numerical value represented by the following formula (12):

$$\Delta N = \Gamma / d \tag{12}$$

wherein $\Delta N$ means a birefringent index, $\Gamma$ means retardation, and d means thickness of a test specimen.

$\Delta N$ means a difference (Ns−Nf) wherein an incident light into the specimen is refracted into two directions and a refractive index of a light having a faster passing rate is referred to as Nf and a refractive index of a light having a slower passing rate is referred to as Ns. Based on the formula (12), $\Delta N$ is proportional to $\Gamma$ and is inversely proportional to the thickness of the specimen. In the invention, $\Gamma$ is measured and a birefringent index $\Delta N$ is determined as a value obtained by dividing $\Gamma$ by the thickness (d) of the specimen. $\Delta N$ shows a degree of orientation of the molded article and stronger orientation results in a larger value. Moreover, since stronger orientation of the specimen results in larger S1 and $\Delta N$, the shrinkage ratio S1 and the birefringent index $\Delta N$ in the invention are correlated with each other and it is considered that a test specimen having larger S1 has larger $\Delta N$.

Moreover, in the molded article using the composition in the invention, in the case that no fluoropolymer (E) is used or a fluoropolymer (E) is used in an extremely small amount, i.e., 0.2 part by weight or less, further 0.1 part by weight or less, a thin molded article oriented in at least one direction is desired. The thin molded article of the invention preferably has a sheet or film shape. Furthermore, a remarkable effect is exhibited by molding the article so as to be oriented at sheet or film molding. Generally, in injection molding, since orientation occurs in a flow direction, shrinkage occurs at the test of flame retardancy and dripping may be prevented. On the other hand, in an extrusion sheet molding wherein stretching is not effected, since orientation hardly occurs, an anti-dripping agent does not effectively exhibit its effect and a dripping phenomenon may occur. In extrusion sheet molding, as one example of a method of stretching a sheet, there may be mentioned a method of stretching a resin in an extrusion direction by increasing the rotation numbers of rolls immediately after sheet extrusion wherein the resin is in a molten state, a method of stretching a sheet in a semi-molten state by differentiating the rate of the first roll immediately after extrusion from the rates of the second roll and the following rolls, a method of further mechanically stretching a sheet material in a solidified state at a temperature of not higher than Tg, or the like method.

As a specific example of a method of preparing the molded article of the invention, sheet-extrusion molding may be mentioned. When a slit width of a die for preparing a sheet is referred to as W and sheet thickness of a final product is referred to as T, a thin molded article stretched so as to be T/W<1 is preferred and more preferred is 0.1<T/W<0.9 and further preferred is 0.4<T/W<0.8.

As a stretching method, stretching injection blow molding can be similarly used.

Figure 1A:
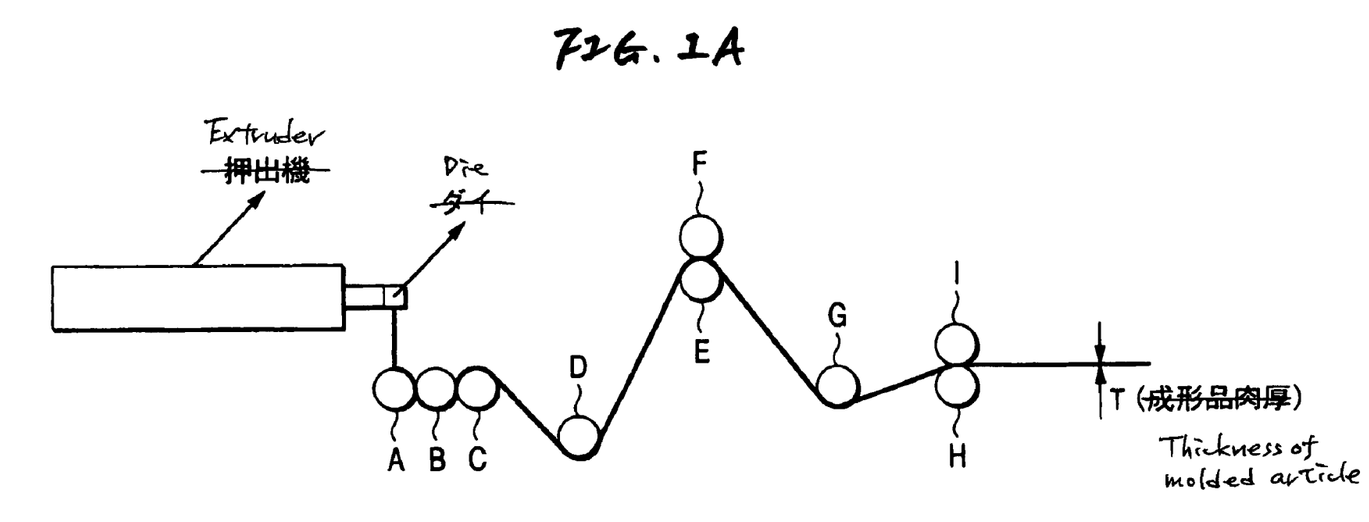
FIG. 1A is a conceptual diagram of sheet-extrusion molding of the invention.
Figure 1B:
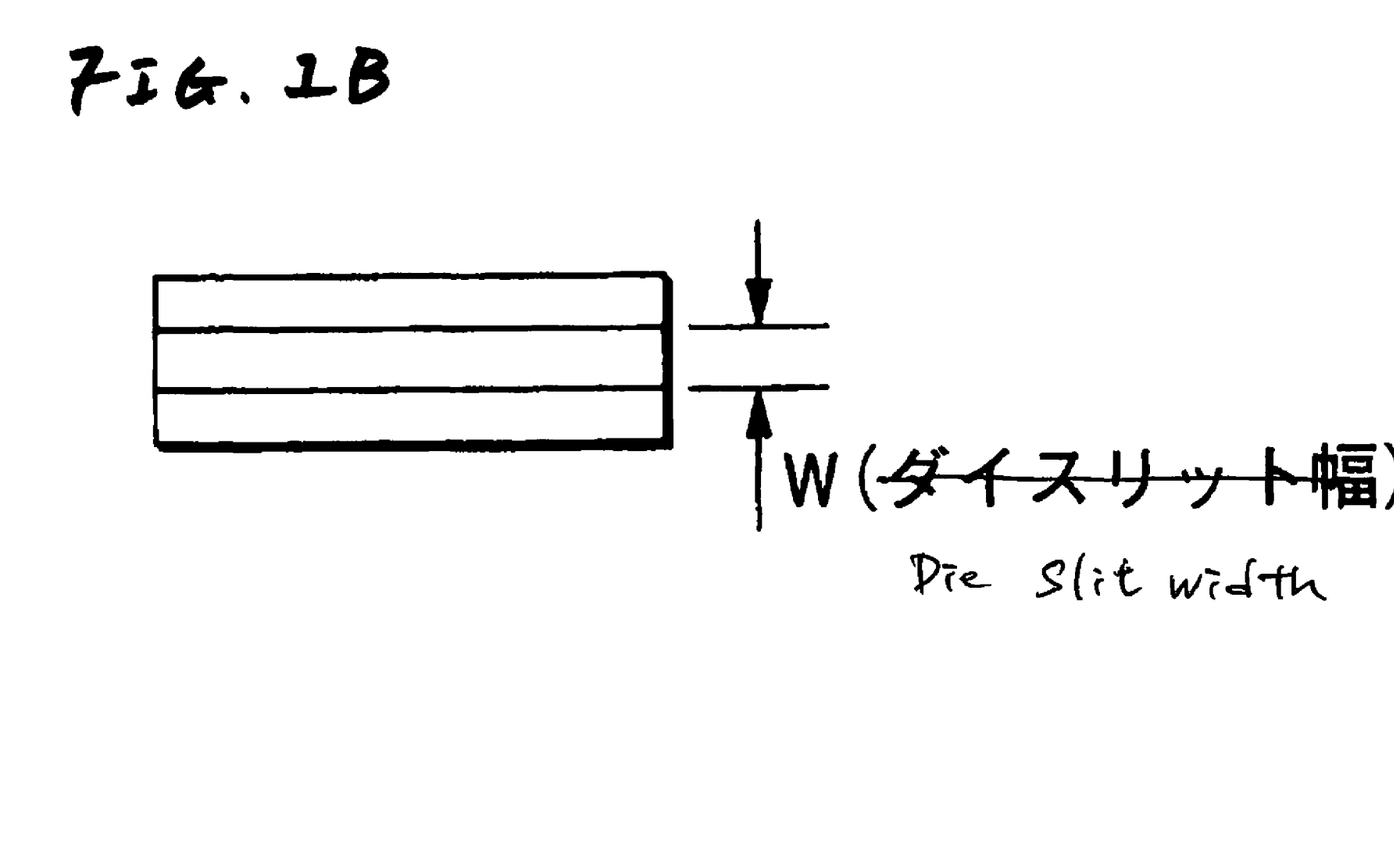
FIG. 1B is a conceptual diagram when a die is viewed from the lower part of FIG. 1A.

FIG. 1 shows on example of a method of sheet-extrusion molding to be used in the invention. FIG. 1A shows a conceptual diagram of sheet-extrusion molding and FIG. 1B shows a conceptual diagram when a die is viewed from the lower part of FIG. 1A, wherein a slit width of the die is referred to as W and thickness of the thin molded article is referred to as T.

A sheet-shaped resin extruded from the die is transferred by rolls A to I. With regard to the thickness of the molded article, a desired molded article can be obtained by a die slit width W and rotation number of the rolls. When W is constant, the thickness of the molded article can be reduced as the rotation number of the rolls is increased. Moreover, it becomes possible to prepare a more highly oriented stretched sheet by increasing the rotation number of the transfer roll D than the rotation numbers of the rolls A, B, and C.

The thickness of the molded article shows thickness obtained by measuring thickness vertical to a flat surface forming the above molded article area by means of a vernier caliper, a micrometer, or a thickness meter.

Examples of thin molded articles of the invention include parts for computers, e.g., desktop computers and notebook computers, parts for portable telephones, electric and electronic devices, portable information terminals, and household electric appliances. In particular, the thin molded articles of the invention are preferably used as insulating films and insulating sheets. Furthermore, battery cases, plastic frames, and the like where thin molded articles are increasingly desired in recent years may be mentioned as suitable uses.

EXAMPLES

In the following Examples and Comparative Examples, thin molded articles were produced using aromatic polycarbonate resin compositions using the following components (A), (B), (C), (D) and the other component(s).

1. Component (A): Aromatic Polycarbonate

A bisphenol A-based polycarbonate produced from bisphenol A and diphenyl carbonate by melt transesterification, which contains 300 ppm of octadecyl-3-(3,5-di-butyl-4-hydroxyphenyl)propionate as a hindered phenol antioxidant.

Weight average molecular weight (Mw)=21,500

Phenolic terminal group ratio (ratio of phenolic terminal groups to all terminal groups)=32 mol %

The phenolic terminal group ratio was measured by nuclear magnetic resonance spectroscopy (NMR method).

2. Component (B): Inorganic Compound

A talc having the following properties.

Average particle diameter=5 μm

Whiteness=96%

Apparent specific volume=2.3 ml/g

Specific surface area=8.5 m$^2$/g

Water content=0.2%

Oil absorption=51 ml/100 g pH=9.3

With regard to a method for measuring the average particle diameter, an analyzer SALD-2000 manufactured by Shimadzu Corporation was used and the particle diameters of individual particles were measured by a laser diffraction method. The median diameter was defined as the average particle diameter of the talc.

The whiteness was measured by the method in accordance with JIS P8123 using digital hunter ST manufactured by Toyo Seiki Co., Ltd.

The specific surface area was measured by the BET adsorption method through vapor-phase adsorption using FlowSorb 2300 manufactured by Shimadzu Corporation.

The water content was measured by the method in accordance with JIS K5101 using STAC-5100 manufactured by Shimadzu Corporation.

The oil absorption and apparent specific volume were measured by the method in accordance with JIS K5101.

The pH value was measured by the pH measuring method (boiling method) in accordance with JIS K5101 standard.

3. Component (C): at Least One Compound Selected from Organic Acidic Compounds and Organic Acidic Compound Derivatives     p-Toluenesulfonic acid (guaranteed reagent, manufactured by Wako Pure Chemical Industries, Ltd.

4. Component (D): at Least One Organic Acid Metal Salt Selected from Organic Acid Alkali Metal Salts and Organic Acid Alkaline Earth Metal Salts     Potassium perfluorobutanesulfonate (trade name: MEGA-FAC F-114 manufactured by DAINIPPON INK & CHEMICALS INC.).

5. Other Components (Anti-Dripping Agent)

Fluoropolymer

A powder mixture (Blendex 449 (registered trademark) manufactured by GE Specialty Chemicals Inc., U.S.A.) of a polytetrafluoroethylene (PTFE) and an acrylonitrile/styrene copolymer (AS), 50/50 (weight ratio).

(UV Absorbent)

Benzotriazole-based 2-(2H-benzotriazol-2-yl)-4-(1,1',3,3'-tetramethylbutyl)phenone was used ("Eversorb 72" manufactured by Everlight Chemical Industrial Co.)

(Mold Release Agent)

Pentaerythritol tetrastearate (Unister H476 (registered trademark) manufactured by NOF Corporation, Japan).

Examples 1 to 6 and Comparative Example 1 to 6

A flame retardant polycarbonate resin composition was obtained by melt-kneading components (A), (B), (C), (D) and the other components, in their respective amounts (parts by weight) as indicated in Table 1, by means of a twin-screw extruder. Specifically, the production process and production conditions are as follows.

The pH value of mixture of the components (B) and (C) in a compositional ratio shown in Tables 1 and 2 was measured in accordance with JIS K5101. As a result, values described in Tables 1 and 2 were obtained.

Melt-kneading was performed by means of a twin-screw extruder (ZSK-25, L/D=37, manufactured by Werner & Pfleiderer GmbH, Germany) under conditions wherein the cylinder temperature was 250° C., the screw rotation number was 250 rpm, and the extrusion rate of the kneaded resin composition was 20 kg/hr.

During the melt-kneading, the temperature of the melted resin composition measured by means of a thermocouple at the die part of the extruder was found to be from 260 to 270° C. Furthermore, removal of volatile substances was performed through a vent provided at a downstream potion of the extruder under reduced pressure (0.005 MPa).

Prior to the melt-kneading, the components (B) and (C) were fed in their respective amounts as indicated in Table 1 to a 10-liter Henschel mixer whose jacket temperature was adjusted to 200° C. and then preblended under stirring at the screw rotation number of 1,450 rpm for 10 minutes. Then, the preblended components were used as the raw materials, which were fed to the twin-screw extruder. The pH value at the preblending treatment was measured in accordance with JIS K5101. The results are shown in Tables 1 and 2.

The obtained pellets of the resin composition were dried at 120° C. for 4 hours and molded into a sheet having a desired thickness by extrusion molding. Then, the following respective tests were performed.

Flame Retardancy Test

The sheet having a desired thickness was cut out as stripe thin molded articles for burning test, which were used as test specimens. After the specimens were maintained at 23° C. under a humidity of 50% for two days, the specimens were subjected to the 50 W (20 mm) Vertical Burning Test in accordance with UL94 standard and classified into V-0, V-1, V-2 and NC(NC means non-classification).

(Level of flame retardancy (more left one is better): V-0>V-1>V-2>NC).

The extrusion of the sheet was performed by means of 65 mm single-screw extruder (GM 65-25 manufactured by GM Engineering Co., Ltd.) and a sheet was molded under conditions wherein the cylinder temperature was 270° C., the screw rotation number was from 15 to 40 rpm, and the extrusion rate was from 10 to 15 kg/hr. A conceptual diagram of apparatus constitution is shown in FIG. 1.

In the case that the sheet was stretched, it was stretched monoaxially in an extrusion direction or monoaxially in a direction vertical to the extrusion direction. The shrinkage ratio and birefringent index of the resulting sheet are shown in Tables 1 and 2.

Measurement of Shrinkage Ratio

With regard to the measurement of the shrinkage ratio, a specimen for heat shrinkage test (a length of 120 mm, a width of 120 mm) in accordance with JIS K6873 was cut out of the sheet. A cross mark was put on the specimen for heat shrinkage test cut out. The mark is a cross where the crossing point of a line (length: 100 mm) parallel to the extrusion direction and a line (length: 100 mm) vertical thereto corresponds to the center of the sheet. The sheet is left under an atmosphere of 170° C. for 30 minutes and a shrinkage ratio of the molded article taken out is measured. The heat shrinkage ratio was calculated according to the following formula (11):

$$S = (l_2 - l_1)/l_1 \times 100 \qquad (11)$$

wherein S means heat shrinkage ratio (%), $l_1$ means distance (mm) between the marks before heating, and $l_2$ means distance (mm) between the marks after heating.

Measurement of Birefringent Index

The birefringent index was measured using the following formula (12):

$$\Delta N = \Gamma/d \qquad (12)$$

wherein $\Delta N$ means a birefringent index, $\Gamma$ means retardation, and d means thickness of a test specimen.

The value of retardation was determined using a retardation measuring apparatus (Model RETS-100 manufactured by Otsuka Electronics Co., Ltd.) by measurement at 10 nm intervals by the rotary analyzer method and calculation using a value at 550 nm. The thickness of the specimen was measured by means of a microgauge.

The T-die had a slit width of 0.8 mm and a slit length of 380 mm.

The sheet extruded from the T-die was transformed into a sheet having a desired thickness by means of rolls with adjusting roll rotation number within the range of 0.8 to 1.2 m/min and balancing it with an extrusion amount. The set temperature of the rolls A, B and C was 120° C. An extruded sheet having a thickness of 0.5 mm had T/W of 0.625 and an extruded sheet having a thickness of 0.4 mm had T/W of 0.5.

From the molded sheet, test specimens were cut out, each of which had a width of 12.7 mm and a length (an extrusion direction of the sheet was considered to be a length direction) of 127 mm. Then, the specimens were subjected to a 20 mm Vertical Burning Test in accordance with UL94V test standard. Moreover, test specimens were cut out, each of which had a width of 50 mm and a length (an extrusion direction of the sheet was considered to be a length direction) of 200 mm. Then, the specimens were subjected to a 20 mm Vertical Burning Test in accordance with UL94VTM test standard. The results are shown in Tables 1 and 2.

In Examples 3, 4, 5, 6, and 7, since shrinkage was large and flames reached the cramp, the cases were judged NC in the V test but VTM-0 was satisfactorily achieved in the VTM test.

To the compositions of Examples 4, 5, and 6, a UV absorbent was added. The Sunshine Weather Meter Exposure Test (JIS B 7753-1993) wherein black panel temperature was 63° C. and irradiation and spraying were cycled at 120 min. intervals (presence of raining) was performed for 2000 hours. As a result, they were found to be excellent in weather resistance as compared with the molded articles of Examples 1, 2, and 3. Fine cracks were observed on the surfaces of the

TABLE 1

|  | Example 1 | Example 2 | Example 3 | Example 4 | Example 5 | Example 6 | Example 7 |
|---|---|---|---|---|---|---|---|
| Component A (part by weight) | 100 | 100 | 100 | 100 | 100 | 100 | 100 |
| Component B (part by weight) | 5 | 5 | 5 | 5 | 5 | 5 | 5 |
| Component C (part by weight) | 0.15 | 0.15 | 0.15 | 0.15 | 0.15 | 0.15 | 0.15 |
| Component D (part by weight) | 0.4 | 0.4 | 0.4 | 0.4 | 0.3 | 0.3 | 0.4 |
| Fluoropolymer (part by weight) | 0 | 0.1 | 0.1 | 0.1 | 0.2 | 0.2 | 0.1 |
| Other component (Mold releasing agent) (part by weight) | 0 | 0 | 0 | 0.2 | 0.2 | 0.2 | 0 |
| Other component (UV absorbent) (part by weight) | 0 | 0 | 0 | 0.3 | 0.3 | 0.3 | 0 |
| pH Value of mixture of components (B) and (C) | 6 | 6 | 6 | 6 | 6 | 6 | 6 |
| Shrinkage ratio S1 | −1.5 | −10.5 | −14.5 | −26.5 | −49.5 | −44 | −29 |
| Shrinkage ratio S2 | −15.5 | 3.5 | 4.5 | 9.5 | 10 | −12 | 10 |
| Birefringent index ΔN | not measured | not measured | mot measured | 0.000129 | 0.000939 | not measured | not measured |
| Thickness of test specimen (mm) | 0.3 (*) | 0.4 | 0.3 | 0.15 | 0.1 | 0.08 (*) | 0.05 |
| Flame retardancy V test | V-2 | V-0 | NC | NC | NC | NC | NC |
| Flame retardancy VTM test | not measured | not measured | VTM-0 | VTM-0 | VTM-0 | VTM-0 | VTM-0 |

(*) A test specimen monoaxially oriented in a direction vertical to an extrusion direction.

TABLE 2

|  | Comparative Example 1 | Comparative Example 2 | Comparative Example 3 | Comparative Example 4 | Comparative Example 5 |
|---|---|---|---|---|---|
| Component A (part by weight) | 100 | 100 | 100 | 100 | 100 |
| Component B (part by weight) | 5 | 0 | 5 | 0 | 0 |
| Component C (part by weight) | 0.15 | 0.15 | 0.15 | 0 | 0 |
| Component D (part by weight) | 0 | 0.4 | 0 | 0 | 0.3 |
| Fluoropolymer (part by weight) | 0 | 4 | 0.1 | 0.1 | 0.2 |
| Other component (Mold releasing agent) (part by weight) | 0 | 0 | 0 | 0.2 | 0.2 |
| Other component (UV absorbent) (part by weight) | 0 | 0 | 0 | 0.3 | 0.3 |
| pH Value of mixture of components (B) and (C) | 6 | 6 | 6 | not measured | not measured |
| Shrinkage ratio S1 | −1.5 | −62 | −80 (*) | −30.5 | −49 |
| Shrinkage ratio S2 | 0 | 12 | 20 | 10 | 10 |
| Birefringent index ΔN | not measured | not measured | not measured | 0.000085 | 0.000950 |
| Thickness of test specimen (mm) | 0.3 | 0.4 | 0.3 | 0.15 | 0.1 |
| Flame retardancy V test | NC | NC | NC | NC | NC |
| Flame retardancy VTM test | NC | not measured | NC | NC | NC |

(*) A test specimen monoaxially oriented in an extrusion direction.

As shown in Example 1, in the case that any fluoropolymer was not added and monoaxial stretching was performed in a direction vertical to an extrusion direction, dripping occurred and thus V-0 was difficult to achieve but the case was not judged NC with shrinking up a fire-catching part of the specimen to the cramp as well as flames were quenched simultaneously to dripping, so that the case was found to be effective for surely achieving V-2.

In Example 2, a good flame retardancy was observed even when the thickness was 0.4 mm.

molded articles derived from the compositions of Examples 1, 2, and 3 but no cracks were formed on the surfaces of the molded articles derived from the compositions of Examples 4, 5, and 6.

With regard to the composition of Comparative Example 1, a long quenching time was observed and flames reached the mark even in the VTM test, so that the case was judged NC.

With regard to the composition of Comparative Example 2, a large degree of shrinkage was observed and flames during the test reached the cramp, so that the case was judged NC.

In Comparative Example 3 which showed results of a specimen monoaxially oriented in an extrusion direction, a large degree of shrinkage was observed even in the VTM test and flames during the test reached the cramp, so that the case was judged NC.

In Comparative Example 4, a flame-quenching effect was small and dripping occurred. In addition, flames reached the cramp, so that the case was judged NC even in the VTM test.

In Comparative Example 5, a flame-quenching effect was small and flames reached the cramp, so that the case was judged NC even in the VTM test.

The present thin molded article was an aromatic polycarbonate resin molded article excellent in mechanical properties, melt stability, and flame retardancy, and more specifically, a flame retardant aromatic polycarbonate resin molded article excellent in these properties even in a thin molded article.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2004-130819 filed on Apr. 27, 2004, Japanese Patent Application No. 2004-177241 filed on Jun. 15, 2004, and Japanese Patent Application No. 2004-315059 filed on Oct. 29, 2004, and the contents thereof are incorporated herein by reference.

INDUSTRIAL APPLICABILITY

As examples of thin molded articles of the present invention, they are used in parts for computers, e.g., desktop computers and notebook computers, parts for portable telephones, electric and electronic devices, portable information terminals, parts for household electric appliances, and the like. In particular, as thin molded sheets, there may be mentioned insulating films, insulating sheets, and the like. Furthermore, battery cases, plastic frames, and the like where thin molded articles are increasingly desired may be mentioned as suitable uses.

The invention claimed is:

1. A polycarbonate thin molded article having a sheet or film shape, comprising a resin composition, the resin composition comprising:
   100 parts by weight of a resin (A), the resin (A) being an aromatic polycarbonate or a resin mainly containing an aromatic polycarbonate;
   0.1 to 200 parts by weight of an inorganic compound (B);
   0.001 to 10 parts by weight of at least one compound (C) selected from the group consisting of an organic sulfonic acid, an organic carboxylic acid, an organic phosphoric acid and an organic sulfonic acid ester; and
   0.001 to 1 part by weight of at least one metal salt (D) selected from an organic acid alkali metal salt and an organic acid alkaline earth metal salt,
   a part corresponding to at least 50% of the surface area of the polycarbonate thin molded article having a thickness of less than 0.5 mm, and
   a shrinkage ratio S1 (%) in a molding flow direction of the polycarbonate thin molded article upon its being left under an atmosphere of 170° C. for 30 minutes satisfying the following formula:

$-60 < S1 < -10.5$, wherein the polycarbonate thin molded article has flame retardancy represented by V-0 or VTM-0 in the test method in accordance with UL94 standard.

2. The polycarbonate thin molded article according to claim 1,
   wherein the birefringent index of the polycarbonate thin molded article is from 0.00001 to 0.002.

3. The polycarbonate thin molded article according to claim 1,
   wherein the resin composition further comprising 1 part by weight or less of a fluoropolymer (E).

4. The polycarbonate thin molded article according to claim 1,
   wherein the compound (C) is contained in such an amount that a mixture of the inorganic compound (B) and the compound (C) has a pH value of from 4 to 8.

5. The polycarbonate thin molded article according to claim 3,
   wherein X and Y satisfy the formula (2) and the formula (3):

$0.15 \leq X \leq 0.5$ \hfill formula (2)

$0.05 \leq Y \leq 0.4$ \hfill formula (3)

wherein the ratio of the metal salt (D) in the resin composition is X % by weight and the ratio of the fluorine compound component of the fluoropolymer (E) in the resin composition is Y % by weight.

6. The polycarbonate thin molded article according to claim 5,
   wherein X and Y satisfy the formula (4), the formula (5) and the formula (6):

$0.15 \leq X$ \hfill (formula (4)

$0.05 \leq Y$ \hfill formula (5)

$X + Y \leq 0.5$ \hfill formula (6).

7. The polycarbonate thin molded article according to claim 1,
   wherein the polycarbonate thin molded article is flame retardant, and
   a shrinkage ratio S1 (%) in a molding flow direction of the polycarbonate thin molded article upon it is left under an atmosphere of 170° C. for 30 minutes satisfies the following formula:

$-30 < S1 < -10.5$.

8. The polycarbonate thin molded article according to claim 1,
   wherein a shrinkage ratio S1 (%) in a molding flow direction of the polycarbonate thin molded article upon it is left under an atmosphere of 170° C. for 30 minutes satisfies the following formula:

$-49.5 < S1 < -10.5$, and wherein a shrinkage ratio S2 (%) in a molding vertical direction of the polycarbonate thin molded article satisfies the following formula:

$12 < S2 < 10$.

9. The polycarbonate thin molded article according to claim 1,
   wherein the polycarbonate thin molded article is an insulating sheet or insulating film.

10. The polycarbonate thin molded article according to claim 1,
    wherein the polycarbonate thin molded article is a molded article for electronic or electric devices.

* * * * *